US009068578B2

(12) United States Patent
Opdenbosch

(10) Patent No.: US 9,068,578 B2
(45) Date of Patent: Jun. 30, 2015

(54) HYDRAULIC SYSTEM HAVING FLOW COMBINING CAPABILITIES

(75) Inventor: Patrick Opdenbosch, Peoira, IL (US)

(73) Assignee: Caterpillar Inc., Peoria, IL (US)

( * ) Notice: Subject to any disclaimer, the term of this patent is extended or adjusted under 35 U.S.C. 154(b) by 857 days.

(21) Appl. No.: 13/278,894

(22) Filed: Oct. 21, 2011

(65) Prior Publication Data

US 2013/0098015 A1 Apr. 25, 2013

(51) Int. Cl.

| | |
|---|---|
| ***F16D 31/02*** | (2006.01) |
| ***F15B 11/17*** | (2006.01) |
| ***F15B 11/16*** | (2006.01) |
| ***F15B 13/06*** | (2006.01) |
| ***E02F 9/22*** | (2006.01) |

(52) U.S. Cl.

CPC ................. *F15B 11/17* (2013.01); *F15B 11/16* (2013.01); *F15B 13/06* (2013.01); *E02F 9/2289* (2013.01); *E02F 9/2296* (2013.01)

(58) Field of Classification Search

CPC .......... F15B 11/16; F15B 11/17; F15B 13/06; E02F 9/2289; E02F 9/2292; E02F 9/2296

USPC ............ 60/422, 427, 465, 484, 486, 489, 490

See application file for complete search history.

(56) References Cited

U.S. PATENT DOCUMENTS

| | | | | |
|---|---|---|---|---|
| 4,369,625 | A | 1/1983 | Izumi et al. | |
| 4,449,366 | A | 5/1984 | Sato et al. | |
| 4,561,249 | A | 12/1985 | Watanabe et al. | |
| 4,586,330 | A | 5/1986 | Watanabe et al. | |
| 4,766,727 | A * | 8/1988 | Dull et al. | 60/427 |
| 4,768,339 | A | 9/1988 | Aoyagi et al. | |
| 4,833,798 | A | 5/1989 | Ehrich | |
| 5,048,293 | A | 9/1991 | Aoyagi | |
| 5,329,767 | A | 7/1994 | Hewett | |

(Continued)

FOREIGN PATENT DOCUMENTS

| | | |
|---|---|---|
| EP | 1 598 561 | 11/2005 |
| EP | 1803630 | 7/2007 |

(Continued)

OTHER PUBLICATIONS

Linjama, M. (2011) entitled “Digital Fluid Power-State of the Art”, The 12$^{th}$ Scandinavian International Conference on Fluid Power, May 18-20, 2011 Tampere, Finland.

(Continued)

*Primary Examiner* — Michael Leslie

(74) *Attorney, Agent, or Firm* — Finnegan, Henderson, Farabow, Garrett & Dunner, LLP

(57) ABSTRACT

A hydraulic system hydraulic system includes a variable displacement pump, and a variable displacement first travel motor selectively fluidly connected to the pump in a closed-loop manner. The system also includes a first switching valve associated with the first travel motor and configured to selectively switch a flow direction of fluid passing through the first travel motor from the pump. The system further includes a variable displacement second travel motor selectively fluidly connected to the pump in a closed-loop manner. The system also includes a second switching valve associated with the second travel motor and configured to selectively switch a flow direction of fluid passing through the second travel motor from the pump.

12 Claims, 2 Drawing Sheets

(56) References Cited

U.S. PATENT DOCUMENTS

| | | | | |
|---|---|---|---|---|
| 6,330,797 | B1 | 12/2001 | Kondo | |
| 6,609,368 | B2 * | 8/2003 | Dvorak et al. | 60/427 |
| 6,745,992 | B2 | 6/2004 | Yang et al. | |
| 6,789,335 | B1 | 9/2004 | Kinugawa et al. | |
| 6,918,247 | B1 | 7/2005 | Warner | |
| 7,243,591 | B2 | 7/2007 | Dixen et al. | |
| 7,260,931 | B2 | 8/2007 | Egelja et al. | |
| 7,272,928 | B2 | 9/2007 | Ariga et al. | |
| 7,412,827 | B2 | 8/2008 | Verkuilen | |
| 7,434,391 | B2 | 10/2008 | Asam et al. | |
| 7,490,421 | B1 | 2/2009 | Pletzer et al. | |
| 7,516,613 | B2 | 4/2009 | Kadlicko | |
| 2004/0060747 | A1 | 4/2004 | Wetzel et al. | |
| 2004/0083629 | A1 | 5/2004 | Kondou | |
| 2004/0123499 | A1 | 7/2004 | Arii | |
| 2005/0012337 | A1 | 1/2005 | Yoshimatsu | |
| 2005/0036894 | A1 | 2/2005 | Oguri | |
| 2007/0044463 | A1 | 3/2007 | VerKuilen et al. | |
| 2008/0250783 | A1 | 10/2008 | Griswold | |
| 2008/0300757 | A1 | 12/2008 | Kanayama et al. | |
| 2008/0314038 | A1 | 12/2008 | Tozawa et al. | |
| 2009/0165450 | A1 | 7/2009 | Cherney et al. | |
| 2009/0288408 | A1 | 11/2009 | Tozawa et al. | |
| 2010/0000209 | A1 | 1/2010 | Wada et al. | |
| 2010/0000211 | A1 | 1/2010 | Ikeda et al. | |
| 2010/0043420 | A1 | 2/2010 | Ikeda et al. | |
| 2010/0050624 | A1 * | 3/2010 | Essig | 60/484 |
| 2010/0107620 | A1 | 5/2010 | Nelson et al. | |
| 2010/0115936 | A1 | 5/2010 | Williamson et al. | |
| 2010/0162593 | A1 | 7/2010 | Hughes, IV et al. | |
| 2010/0162885 | A1 | 7/2010 | Hughes, IV et al. | |
| 2010/0163258 | A1 | 7/2010 | Hughes, IV et al. | |
| 2010/0218493 | A1 | 9/2010 | Nakamura et al. | |
| 2011/0029206 | A1 | 2/2011 | Kang et al. | |
| 2011/0030364 | A1 | 2/2011 | Persson et al. | |

FOREIGN PATENT DOCUMENTS

| | | |
|---|---|---|
| GB | 2 269 425 | 2/1994 |
| JP | 56-016735 | 2/1981 |
| JP | 57-134007 | 8/1982 |
| JP | 58-044133 | 3/1983 |
| JP | 02-108733 | 4/1990 |
| JP | 06-057786 | 3/1994 |
| JP | 06-101249 | 4/1994 |
| JP | 10-96402 | 4/1998 |
| JP | 2002-087336 | 3/2002 |
| JP | 2004-100366 | 4/2004 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |

OTHER PUBLICATIONS

Zimmerman, J. PhD Student/Purdue University, Center for Compact and Efficient Fluid Power PowerPoint Presentation, 2010 Annual Meeting (Jun. 14).

Zimmerman, J. et al., "Hybrid Displacement Controlled Multi-Actuator Hydraulic Systems", The Twelfth Scandinavian International Conference on Fluid Power , Tampere, Finland (May 18-20, 2011).

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic and pneumatic 20 (1976) Nr. 4.

Linde Hydraulics Brochure entitled "HPV-02. Variable Pumps for Closed Loop Operation", available at least as early as Aug. 31, 2011, pp. 1-36.

* cited by examiner

HYDRAULIC SYSTEM HAVING FLOW COMBINING CAPABILITIES

TECHNICAL FIELD

The present disclosure relates generally to a hydraulic system and, more particularly, to a hydraulic system having flow combining capabilities.

BACKGROUND

A conventional hydraulic system includes a pump that draws low-pressure fluid from a tank, pressurizes the fluid, and makes the pressurized fluid available to multiple different actuators for use in moving the actuators. In this arrangement, a speed of each actuator can be independently controlled by selectively throttling (i.e., restricting) a flow of the pressurized fluid from the pump into each actuator. For example, to move a particular actuator at a high speed, the flow of fluid from the pump into the actuator is restricted by only a small amount. In contrast, to move the same or another actuator at a low speed, the restriction placed on the flow of fluid is increased. Although adequate for many applications, the use of fluid restriction to control actuator speed can result in flow losses that reduce an overall efficiency of a hydraulic system.

An alternative type of hydraulic system is known as a meterless hydraulic system. A meterless hydraulic system generally includes a pump connected in closed-loop fashion to a single actuator or to a pair of actuators operating in tandem. During operation, the pump draws fluid from one chamber of the actuator(s) and discharges pressurized fluid to an opposing chamber of the same actuator(s). To move the actuator(s) at a higher speed, the pump discharges fluid at a faster rate. To move the actuator with a lower speed, the pump discharges the fluid at a slower rate. A meterless hydraulic system is generally more efficient than a conventional hydraulic system because the speed of the actuator(s) is controlled through pump operation as opposed to fluid restriction. That is, the pump is controlled to only discharge as much fluid as is necessary to move the actuator(s) at a desired speed, and no throttling of a fluid flow is required.

An exemplary meterless hydraulic system is disclosed in U.S. Pat. No. 4,369,625 to Izumi et al. ("the '625 patent"). The '625 patent describes a multi-actuator meterless hydraulic system having flow combining functionality. The hydraulic system of the '625 patent includes a swing circuit, a boom circuit, a stick circuit, a bucket circuit, a left travel circuit, and a right travel circuit. Each of the swing, boom, stick, and bucket circuits have a pump connected to a specialized actuator in a closed-loop manner. In addition, a first combining valve is connected between the swing and stick circuits, a second combining valve is connected between the stick and boom circuits, and a third combining valve is connected between the bucket and boom circuits. The left and right travel circuits are connected in parallel to the pumps of the bucket and boom circuits, respectively. In this configuration, any one actuator can receive pressurized fluid from more than one pump.

Although an improvement over existing meterless hydraulic systems, the functionality of the meterless hydraulic system disclosed in the '625 patent is limited. In particular, none of the individual circuit pumps are capable of providing fluid to more than one actuator simultaneously. Thus, operation of connected circuits of the system may only be sequentially performed. For example, when the stick is operating in a high load condition, the first combining valve may temporarily combine fluid provided to the stick by the stick circuit with supplemental fluid from the swing circuit. While such a combined flow may assist in meeting stick demand, the system is not capable of operating both the stick circuit and the swing circuit simultaneously while providing the combined flow to the stick. As a result, operation of the hydraulic system disclosed in the '625 patent may be limited in certain situations.

In addition, the speeds and forces of the various actuators may be difficult to control. For example, the hydraulic system of the '625 patent employs fixed displacement motors in the left and right travel circuits, as well as the swing circuit. These motors are only capable of operating at speeds and rotation directions determined by the corresponding pumps of the bucket, boom, and swing circuits, respectively. Such a configuration does not allow for independent speed and/or rotation direction control of the actuators unless the displacement and/or rotation direction of the associated pumps is also changed. Controlling the actuators in this way may be difficult and/or undesirable in certain applications.

The hydraulic system of the present disclosure is directed toward solving one or more of the problems set forth above and/or other problems of the prior art.

SUMMARY

In an exemplary embodiment of the present disclosure, a hydraulic system includes a variable displacement pump, and a variable displacement first travel motor selectively fluidly connected to the pump in a closed-loop manner. The system also includes a first switching valve associated with the first travel motor and configured to selectively switch a flow direction of fluid passing through the first travel motor from the pump. The system further includes a variable displacement second travel motor selectively fluidly connected to the pump in a closed-loop manner. The system also includes a second switching valve associated with the second travel motor and configured to selectively switch a flow direction of fluid passing through the second travel motor from the pump.

In another exemplary embodiment of the present disclosure, a hydraulic system includes a first hydraulic circuit. The first hydraulic circuit includes a variable displacement first pump, a variable displacement first travel motor selectively fluidly connected to the first pump in a closed-loop manner, and a first switching valve associated with the first travel motor and configured to change a speed of the first travel motor. The first hydraulic circuit of the hydraulic system also includes a variable displacement second travel motor selectively fluidly connected to the first pump in a closed-loop manner, and a second switching valve associated with the second travel motor and configured to change a speed of the second travel motor independent of the speed of the first travel motor. The first pump is configured to provide fluid to the first and second travel motors simultaneously.

In a further exemplary embodiment of the present disclosure, a method of controlling a hydraulic system includes providing fluid to a variable displacement first travel motor in a closed loop manner with a variable displacement pump, and simultaneously providing fluid to a variable displacement second travel motor in a closed loop manner with the pump. The method also includes changing a speed of the second travel motor independent of a speed of the first travel motor.

DETAILED DESCRIPTION

Figure 1:
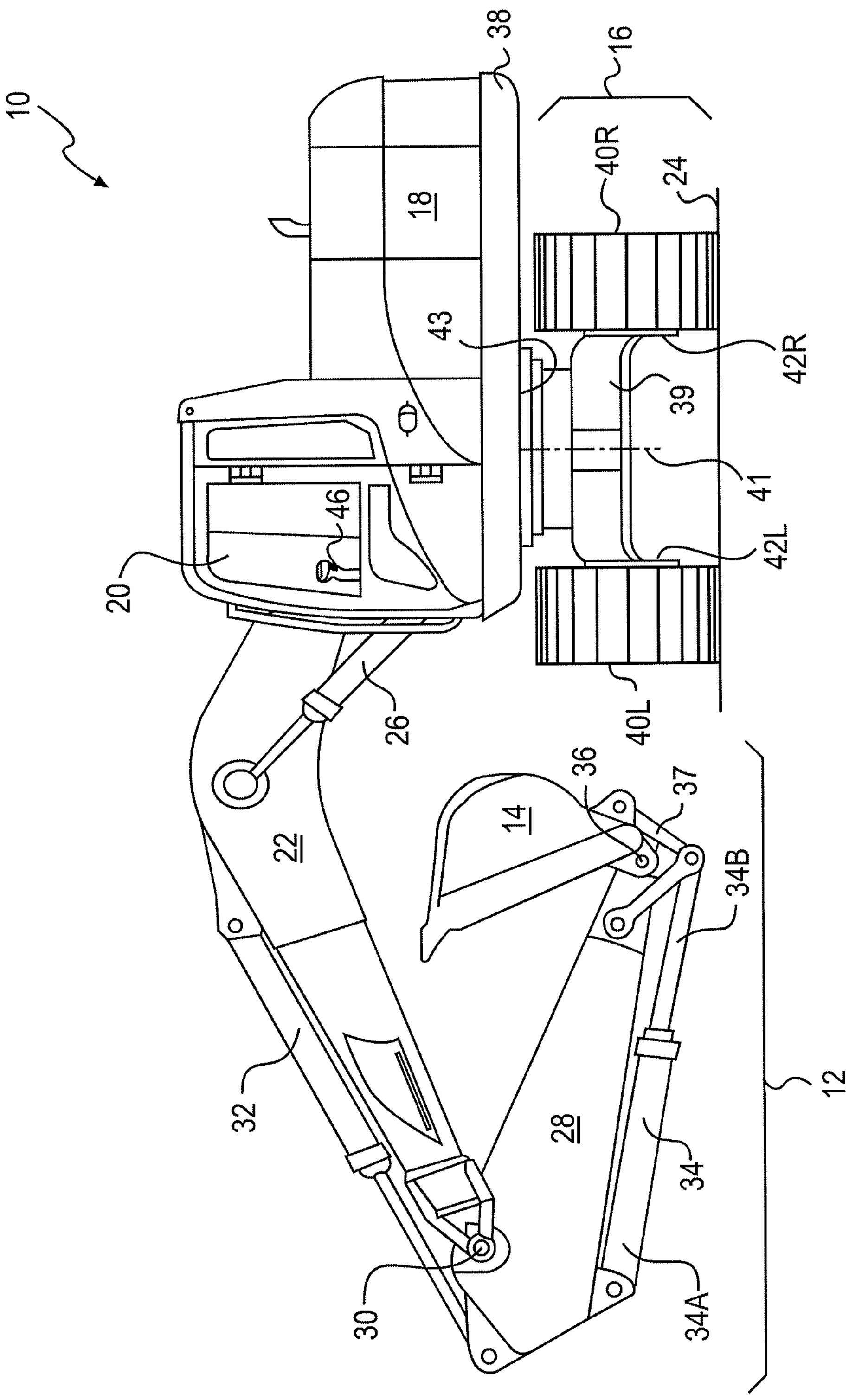
FIG. 1 is a pictorial illustration of an exemplary machine.

FIG. 1 illustrates an exemplary machine 10 having multiple systems and components that cooperate to accomplish a task. Machine 10 may embody a fixed or mobile machine that performs some type of operation associated with an industry such as mining, construction, fainting, transportation, or another industry known in the art. For example, machine 10 may be an earth moving machine such as an excavator (shown in FIG. 1), a dozer, a loader, a backhoe, a motor grader, a dump truck, or any other earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by fluid actuators to move work tool 14. Specifically, implement system 12 may include a boom 22 that is vertically pivotal about a horizontal axis (not shown) relative to a work surface 24 by a pair of adjacent, double-acting, hydraulic cylinders 26 (only one shown in FIG. 1). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected to a body 38 of machine 10. Body 38 may be pivotally connected to an undercarriage 39 and movable about a vertical axis 41 by a hydraulic swing motor 43. Stick 28 may pivotally connect boom 22 to work tool 14 by way of axis 30 and 36.

Numerous different work tools 14 may be attachable to a single machine 10 and operator controllable. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction, work tool 14 may alternatively or additionally rotate, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks such as wheels, belts, or other known traction devices. Machine 10 may be steered by generating a speed and/or rotational direction difference between left and right travel motors 42L, 42R, while straight travel may be facilitated by generating substantially equal output speeds and rotational directions from left and right travel motors 42L, 42R.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving hydraulic cylinders 26, 32, 34, left and right travel motors 42L, 42R, and swing motor 43.

Operator station 20 may include devices that receive input from a machine operator indicative of desired machine maneuvering. Specifically, operator station 20 may include one or more operator interface devices 46, for example a joystick, a steering wheel, and/or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
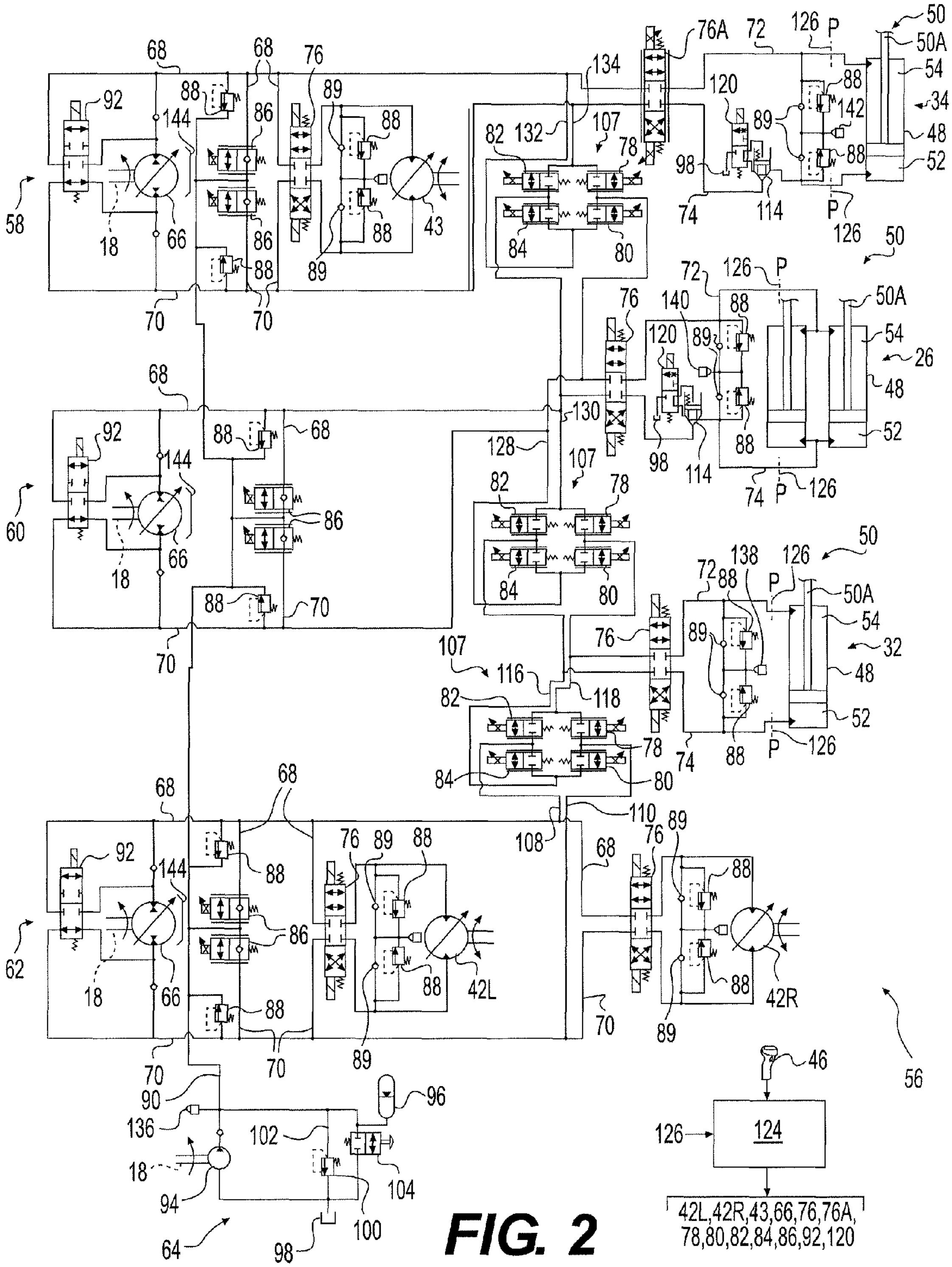
FIG. 2 is a schematic illustration of an exemplary hydraulic system that may be used in conjunction with the machine of FIG. 1.

As shown schematically in FIG. 2, hydraulic cylinders 26, 32, 34 may comprise any type of linear actuator known in the art. Each hydraulic cylinder 26, 32, 34 may include a tube 48 and a piston assembly 50 arranged within tube 48 to form a first chamber 52 and an opposing second chamber 54. In one example, a rod portion 50A of piston assembly 50 may extend through an end of second chamber 54. As such, second chamber 54 may be considered the rod-end chamber of hydraulic cylinders 26, 32, 34, while first chamber 52 may be considered the head-end chamber.

First and second chambers 52, 54 may each be selectively provided with pressurized fluid and drained of the pressurized fluid to cause piston assembly 50 to move within tube 48, thereby changing an effective length of hydraulic cylinders 26, 32, 34, and moving boom 22, stick 28 and/or work tool 14 (referring to FIG. 1). A flow rate of fluid into and out of first and second chambers 52, 54 may relate to a translational velocity of hydraulic cylinders 26, 32, 34, while a pressure differential between first and second chambers 52, 54 may relate to a force imparted by hydraulic cylinders 26, 32, 34 on the associated linkage structure of implement system 12.

Swing motor 43, like hydraulic cylinders 26, 32, 34, may be driven by a fluid pressure differential. Specifically, swing motor 43 may include first and second chambers (not shown) located to either side of a pumping mechanism such as an impeller, plunger, or series of pistons (not shown). When the first chamber is filled with pressurized fluid and the second chamber is drained of fluid, the pumping mechanism may be urged to move or rotate in a first direction. Conversely, when the first chamber is drained of fluid and the second chamber is filled with pressurized fluid, the pumping mechanism may be urged to move or rotate in an opposite direction. The flow rate of fluid into and out of the first and second chambers may determine an output velocity of swing motor 43, while a pressure differential across the pumping mechanism may determine an output torque. It is contemplated that a displacement of swing motor 43 may be variable, if desired, such that for a given flow rate and/or pressure of supplied fluid, a speed and/or torque output of swing motor 43 may be adjusted.

Similar to swing motor 43, each of left and right travel motors 42L, 42R may be driven by creating a fluid pressure differential. Specifically, each of left and right travel motors 42L, 42R may include first and second chambers (not shown) located to either side of a pumping mechanism (not shown). When the first chamber is filled with pressurized fluid and the second chamber is drained of fluid, the pumping mechanism may be urged to move or rotate a corresponding traction device (40L, 40R) in a first direction. Conversely, when the first chamber is drained of the fluid and the second chamber is filled with the pressurized fluid, the respective pumping mechanism may be urged to move or rotate the traction device in an opposite direction. The flow rate of fluid into and out of the first and second chambers may determine a velocity of left and right travel motors 42L, 42R, while a pressure differential between left and right travel motors 42L, 42R may determine a torque. It is contemplated that a displacement of left and right travel motors 42L, 42R may be variable, if desired, such that for a given flow rate and/or pressure of supplied fluid, a velocity and/or torque output of travel motors 42L, 42R may be adjusted. In additional exemplary embodiments, one or more of the swing motor 43, left travel motor 42L, and right travel motor 42R may be an overcenter-type motor. It is understood that in such exemplary embodiments, additional controls and/or load-holding equipment may be necessary when changing flow direction.

As illustrated in FIG. 2, machine 10 may include a hydraulic system 56 having a plurality of fluid components that cooperate to move work tool 14 (referring to FIG. 1) and machine 10. In particular, hydraulic system 56 may include, among other things, a plurality of hydraulic circuits 58, 60, 62, and a charge circuit 64 selectively fluidly connected to each of the circuits 58, 60, 62. Hydraulic circuit 58 may be a bucket circuit associated with hydraulic cylinder 34 and swing motor 43. Hydraulic circuit 60 may be a boom circuit associated with hydraulic cylinders 26. Hydraulic circuit 62 may be a stick circuit associated with hydraulic cylinder 32, left travel motor 42L, and right travel motor 42R. It is contemplated that additional and/or different configurations of circuits may be included within hydraulic system 56 such as, for example, an independent circuit associated with each separate actuator (e.g., hydraulic cylinders 32, 34, 26, left travel motor 42L, right travel motor 42R, and/or swing motor 43), if desired. In addition, in exemplary embodiments, one or more of the circuits 58, 60, 62 may be meterless circuits.

In the disclosed embodiment, each of the hydraulic circuits 58, 60, 62 may include a plurality of interconnecting and cooperating fluid components that facilitate the simultaneous and independent use and control of the associated actuators. For example, each circuit 58, 60, 62 may include a pump 66 fluidly connected to its associated rotary and/or linear actuators in parallel via a closed-loop formed by upper-side and lower-side (relative to FIG. 2) passages. Specifically, each pump 66 may be connected to its rotary actuator (e.g., to left-travel motor 42L, right travel motor 42R, or swing motor 43) via a first pump passage 68 and a second pump passage 70. In addition, each pump 66 may be connected to its linear actuator (e.g., to hydraulic cylinder 26, 32, or 34) via first and second pump passages 68, 70, a rod-end passage 72, and a head-end passage 74. To cause the rotary actuator to rotate in a first direction, first pump passage 68 may be filled with fluid pressurized by pump 66, while second pump passage 70 may be filled with fluid exiting the rotary actuator. To reverse direction of the rotary actuator, second pump passage 70 may be filled with fluid pressurized by pump 66, while first pump passage 68 may be filled with fluid exiting the rotary actuator. During an extending operation of a particular linear actuator, head-end passage 74 may be filled with fluid pressurized by pump 66, while rod-end passage 72 may be filled with fluid returned from the linear actuator. In contrast, during a retracting operation, rod-end passage 72 may be filled with fluid pressurized by pump 66, while head-end passage 74 may be filled with fluid returned from the linear actuator.

In exemplary embodiments, a pump valve 92 may be fluidly connected to pump 66 to protect pump 66 from damaging pressure spikes that could enter pump 66. In addition, pump valve 92 facilitates isolating a first pump 66 when the hydraulic circuit associated with first pump 66 receives fluid from a second hydraulic circuit while the first pump 66 is not in use. Pump valve 92 may be transitioned between a first position directing fluid from the pump 66 into the first pump passage 68, and a second position (shown in FIG. 2) directing fluid from the pump 66 into the second pump passage 70. In exemplary embodiments, pump valve 92 may comprise a two or three position on/off valve.

Each pump 66 may have a variable displacement and be controlled to draw fluid from its associated actuators and discharge the fluid at a specified elevated pressure back to the actuators in two different directions. That is, pump 66 may include a displacement controller 144 such as a swashplate and/or other like stroke-adjusting mechanism. The position of various components of the displacement controller 144 may be electro-hydraulically and/or hydro-mechanically adjusted based on, among other things, a demand, desired speed, desired torque, and/or load of one or more of the actuators to thereby change a displacement (e.g., a discharge rate) of pump 66. In exemplary embodiments, the displacement controller 144 may change the displacement of pump 66 in response to a combined demand of one or more of left-travel motor 42L, right travel motor 42R, swing motor 43, and hydraulic cylinders 26, 32, 34. The displacement of pump 66 may be varied from a zero displacement position at which substantially no fluid is discharged from pump 66, to a maximum displacement position in a first direction at which fluid is discharged from pump 66 at a maximum rate into first pump passage 68. Likewise, the displacement of pump 66 may be varied from the zero displacement position to a maximum displacement position in a second direction at which fluid is discharged from pump 66 at a maximum rate into second pump passage 70. Pump 66 may be drivably connected to power source 18 of machine 10 by, for example, a countershaft, a belt, or in another suitable manner. Alternatively, pump 66 may be indirectly connected to power source 18 via a torque converter, a gear box, an electrical circuit, or in any other manner known in the art. It is contemplated that pumps 66 of different circuits may be connected to power source 18 in tandem (e.g., via the same shaft) or in parallel (via a gear train), as desired.

Pump 66 may also be selectively operated as a motor. More specifically, when an associated actuator is operating in an overrunning condition, the fluid discharged from the actuator may have a pressure elevated higher than an output pressure of pump 66. In this situation, the elevated pressure of the actuator fluid directed back through pump 66 may function to drive pump 66 to rotate with or without assistance from power source 18. Under some circumstances, pump 66 may even be capable of imparting energy to power source 18, thereby improving an efficiency and/or capacity of power source 18.

During some operations, it may be desirable to cause movement of a linear actuator and/or a rotary actuator without causing movement of other actuators within the same circuit. It may also be desirable to selectively switch a flow direction of fluid passing through a linear and/or rotary actuator without switching the flow direction of fluid passing through other actuators within the same circuit and without switching a rotation direction of the pump. Such selective switching may change the travel direction of the associated actuator. For these purposes, each of circuits 58, 60, 62 may be provided with a switching valve 76 capable of substantially isolating the rotary actuator and/or the linear actuator from its associated pump 66 and/or other hydraulic circuit components. Switching valves 76 may also be configured to selectively switch a flow direction of fluid passing through the associated rotary actuator and/or the linear actuator. In exemplary embodiments, the switching valves 76 may be configured to selectively switch the flow direction of each actuator within the circuit independently.

In an exemplary embodiment, one or more of the switching valves 76 may be any type of non-variable on/off type valve. Such valves may be, for example, two-position or three-position four-way spool valves that are solenoid-actuated between one or more flow-passing positions, and are spring-biased toward a flow-blocking position. Such flow passing positions may include, for example, a direct flow passing position and a cross-flow passing position, wherein the cross-flow passing position may direct fluid in a direction opposite or reversed from the direct flow passing position. When switching valves 76 are in one of the flow-passing positions, fluid may flow substantially unrestricted between first and second pump passages 68, 70 by way of the rotary actuator and/or the linear actuator. When switching valves 76 are in the flow-blocking position, fluid flows within first and second pump passages 68, 70 may not pass through and substantially affect the motion of the rotary actuator and/or the linear actuator. It is contemplated that switching valves 76 may also function as load-holding valves, hydraulically locking movement of the rotary actuator and/or the linear actuator. Such hydraulic locking may occur when, for example, the associated actuators have non-zero displacement and switching valves 76 are in their flow-blocking positions. Similar functionality may also be provided by dedicated shut-off valves 120 and load-holding valves 114 associated with the various linear actuators shown in FIG. 2. It is understood that, due to the construction of such valves, dedicated poppet-type load holding valves 114 and the like may have superior leakage and drift characteristics than, for example, spool-type switching valves 76.

In additional exemplary embodiments, one or more of the switching valves 76 may be any type of variable position valve. For example, in embodiments in which one or more of the rotary actuators are prevented from reaching zero displacement, the associated switching valve 76 may be a variable position valve. Such variable position switching valves 76 may be, for example, four-way spool valves and/or any other like valves or group of valves configured to have the flow-passing, flow-blocking, flow-restricting, flow-switching and/or other functionality described herein. In further exemplary embodiments, one or more of the switching valves 76 may comprise four independent two-position, two-way poppet valves. Variable position switching valves 76 may be configured to controllably vary the amount of fluid passing therethrough, and an exemplary variable switching valve 76A is illustrated in FIG. 2 associated with hydraulic circuit 58. For example, such variable position switching valves may permit passage of any desired flow of fluid. Such desired flows may vary between a substantially unrestricted flow at a fully open flow-passing position and a completely restricted flow (i.e., no flow) at a fully closed flow-blocking position. In such exemplary embodiments, the switching valves 76 may be configured to controllably vary, increase, decrease, and/or otherwise change a linear or rotational speed of the associated actuators, in addition to facilitating isolation and/or selective flow direction switching of the associated actuators. Such switching valves 76 may be configured to change the respective speeds of the associated actuators independently by restricting flow through the associated actuators. For example, there may be times when one of the pumps 66 provides fluid to more than one actuator simultaneously. In such applications, it may be desirable to change a speed of one of the actuators without changing a speed of the remaining actuators receiving fluid from the pump 66, and a variable position switching valve 76 may be configured to independently change the speed of its associated actuator by variably restricting the flow of fluid through the actuator. Such flow and/or speed control may be useful in, for example, independently changing the rotational speed of the left and right travel motors 42L, 42R and/or the hydraulic cylinder 32 when the pump 66 of hydraulic circuit 62 provides fluid to each of these actuators simultaneously. It is understood that the flow of fluid through each hydraulic circuit 58, 60, 62 may be controlled by the associated pump 66, and as this flow passes through respective switching valves 76, changing the conductance switching valve 76 imposes on this flow has the effect of altering the pressure difference across the switching valve 76. Thus, for a given flow passing through switching valve 76 to a respective actuator, such a change in conductance will dictate the speed of the actuator if the pressures balance the load being applied to the actuator. Although described above with respect to the exemplary actuators of hydraulic circuit 62, variable position switching valves 76 may have similar functionality when associated with the actuators of any of circuits 58, 60, 62.

As shown in FIG. 2, each of the hydraulic circuits 58, 60, 62 may be fluidly connected to one another via one or more combining valves 107. Combining valves 107 may comprise one or more flow control components configured to facilitate directing fluid between the circuits 58, 60, 62 and/or combining fluid from two or more sources. In an exemplary embodiment, one or more of the combining valves 107 may comprise a plurality of two or three-position, variable (proportional-type) valves. In further exemplary embodiments, one or more of the combining valves 107 may comprise a plurality of non-variable position on/off valves. In the exemplary embodiment of FIG. 2, each of the combining valves 107 may comprise first, second, third, and fourth valves 78, 80, 82, 84, and one or more of the first, second, third, and fourth valves 78, 80, 82, 84 may comprise a variable position valve. The valves 78, 80, 82, 84 may be controlled to permit and/or restrict passage of fluid between any of the circuits 58, 60, 62, and/or components thereof. For example, as shown with respect to the combining valve 107 of hydraulic circuit 62, each of the valves 78, 80, 82, 84 may be selectively fluidly connected to the first pump passage 68 and/or the second pump passage 70 via passages 108, 110. Likewise, the valves 78, 80, 82, 84 of the combining valve 107 associated with hydraulic circuit 60 may be selectively fluidly connected to the combining valve 107 of hydraulic circuit 62 via passages 116, 118. Similar fluid communication between the combining valve 107 associated with hydraulic circuit 58 is provided via passages 128, 130, 132, 134. Through the various fluid connections of the combining valves 107, fluid may be simultaneously provided from one or more pumps 66 to any of the actuators of hydraulic system 56. The combining valves 107 may also be configured to isolate one or more of the circuits 58, 60, 62 and/or components thereof.

For example, in some operations it may be desirable to supplement a flow of fluid provided to a particular actuator by a first pump 66 with a flow of fluid from a second pump 66 of a separate hydraulic circuit 58, 60, 62. For these purposes, one or more of the combining valves 107 may be used to direct fluid from the pumps 66 of different respective hydraulic circuits 58, 60, 62 to the actuator simultaneously, thereby directing a "combined flow" of fluid to the actuator. With respect to, for example, hydraulic circuit 62, such a combined flow of fluid may be required when the hydraulic cylinder 32 is operated simultaneously with one or both of the left and right travel motors 42L, 42R. In such operations, the combined demand of the actuators 32, 42L, 42R may exceed the maximum displacement of the pump 66 of hydraulic circuit 62. As a result, one or more of the combining valves 107 may be controlled to combine fluid provided by the pump 66 of hydraulic circuit 60 with fluid provided by the pump 66 of hydraulic circuit 62, and to direct a combined flow of fluid to the hydraulic cylinder 32. When such a combined flow of fluid from the pumps 66 is directed to the hydraulic cylinder 32 via the one or more combining valves 107, the switching valve 76 associated with the hydraulic cylinder 32 may be used to variably restrict flow through the hydraulic cylinder 32 if combining valves 107 are not proportional. Alternatively, if combining valves 107 are proportional, such combining valves 107 may be used to variably restrict flow through hydraulic cylinder 32 and switching valve 76 may be used as an on/off valve. In addition or in the alternative, one or both of the respective switching valves 76 associated with the left and right travel motors 42L, 42R may be used to variably restrict flow through the travel motors 42L, 42R. Restricting flow with one or more of the switching valves 76 while providing a combined flow to one or more of the actuators may assist in controlling the speed of the one or more actuators.

In addition to facilitating flow-combining between any of the hydraulic circuits 58, 60, 62, the combining valves 107 may also facilitate the flow-switching functionality described above with respect to the switching valves 76. For example, with respect to hydraulic circuit 62, there may be times when movement of one of the left and right travel motors 42L, 42R in a first direction and simultaneous retraction of the hydraulic cylinder 32 is desired, while at other times movement of the one of the travel motors 42L, 42R in the first direction and extension of the hydraulic cylinder 32 is desired. During the first situation, the pump 66 of hydraulic circuit 62 may be required to pressurize the first pump passage 68 and the rod-end passage 72 fluidly connected to the hydraulic cylinder 32, while during the second situation, pump 66 may be required to pressurize first pump passage 68 and the head-end passage 74 fluidly connected to the hydraulic cylinder 32. While, for example, the switching valve 76 associated with hydraulic cylinder 32 may selectively switch the flow direction of fluid passing through hydraulic cylinder 32, the valves 78, 80, 82, 84 may direct pressurized fluid to and receive pressurized fluid from the switching valve 76 to facilitate these operations.

In particular, when first pump passage 68 is pressurized by pump 66 and retraction of hydraulic cylinder 32 is desired, third valve 82 may be moved to its flow-passing position such that rod-end passage 72 and second chamber 54 of hydraulic cylinder 32 are also pressurized by way of associated switching valve 76 in its direct flow-passing position. At this same time, second valve 80 may be in its flow-passing position such that fluid discharged from first chamber 52 passes through head-end passage 74 and switching valve 76 to second pump passage 70, and back to pump 66. In contrast, when first pump passage 68 is pressurized by pump 66 and extension of the hydraulic cylinder 32 is desired, fourth valve 84 may be moved to its flow-passing position such that head-end passage 74 and first chamber 52 of the linear actuator are also pressurized by way of the switching valve 76. At this same time, first valve 78 may be in its flow-passing position such that fluid discharged from second chamber 54 passes through rod-end passage 72 and switching valve 76 to second pump passage 70, and back to pump 66.

In further exemplary embodiments, combining valves 107 and switching valves 76 may be used to facilitate fluid regeneration of the associated linear actuators. For example, when valves 82, 84 are moved to their flow passing positions and valves 78, 80 are in their flow-blocking positions, high-pressure fluid may be transferred from one chamber to the other of the linear actuator via the switching valve 76 and valves 82, 84, without the fluid ever passing through pump 66. It is understood that when regenerating during extension of hydraulic cylinder 32, pump 66 of hydraulic circuit 62 may supply fluid to hydraulic cylinder 32 in the amount of the difference between the flow into first chamber 52 and the flow exiting second chamber 54. Likewise, when regenerating during retraction of hydraulic cylinder 32, pump 66 of hydraulic circuit 62 may receive excess fluid from hydraulic cylinder 32 in the amount of the difference between the flow into second chamber 54 and the flow exiting first chamber 52. Similar functionality may alternatively be achieved by moving valves 78, 80 to their flow-passing positions while holding valves 82, 84 in their flow-blocking positions.

It will be appreciated by those of skill in the art that the respective rates of hydraulic fluid flow into and out of first and second chambers 52, 54 of hydraulic cylinders 26, 32, 34 during extension and retraction may not be equal. That is, because of the location of rod portion 50A within second chamber 54, piston assembly 50 may have a reduced pressure area within second chamber 54, as compared with a pressure area within first chamber 52. Accordingly, during retraction of hydraulic cylinders 26, 32, 34, more hydraulic fluid may be forced out of first chamber 52 than can be consumed by second chamber 54 and, during extension, more hydraulic fluid may be consumed by first chamber 52 than is forced out of second chamber 54. In order to accommodate the excess fluid discharge during retraction and the additional fluid required during extension, each of hydraulic cylinders 26, 32, 34 may be provided with two makeup valves 89 and two relief valves 88 that are fluidly connected to a connection 136 of the charge circuit 64 via respective connections 138, 140, 142. Each hydraulic circuit 58, 60, 62 may include similar makeup valve 86 and relief valve 88 arrangements fluidly connected to the charge circuit 64 via a common passage 90. It is also understood that to avoid damage to hydraulic cylinders 26, 32, 34 and/or to otherwise dissipate energy from the pressurized fluid leaving hydraulic cylinders 26, 32, 34, the switching valve 76 associated with each cylinder 26, 32, 34 may be configured to variably restrict flow through and/or otherwise reduce the speed of the respective cylinder 26, 32, 34 even during regeneration.

As shown in FIG. 2, makeup valves 89 associated with hydraulic cylinders 26, 32, 34 may each be check valves or other like valves configured to restrict flow in a first direction and to only permit flow in a second direction when the flow pressure exceeds a spring bias of the valve. For example, makeup valves 89 may be configured to selectively allow pressurized fluid from charge circuit 64 to enter rod-end passage 72 and/or head-end passage 74 via respective connections 138, 140, 142. Such valves may, however prohibit fluid from passing in the opposite direction.

Makeup valves 86 associated with hydraulic circuits 58, 60, 62, on the other hand, may each be variable position valves disposed between common passage 90 and one of first and second pump passages 68, 70, and each may be configured to selectively allow pressurized fluid from charge circuit 64 to enter first and second pump passages 68, 70. In particular, each of makeup valves 86 may be solenoid-actuated from a first position at which fluid freely flows between common passage 90 and the respective first and second pump passage 68, 70, toward a second position at which fluid from common passage 90 may flow only into first and second pump passage 68, 70 when a pressure of common passage 90 exceeds the pressure of first and second pump passages 68, 70 by a threshold amount. Makeup valves 86 may be spring-biased toward their second positions, and only moved toward their first positions during operations known to have need of positive or negative makeup fluid. Makeup valves 86 may also be used to facilitate fluid regeneration between first and second pump passages 68, 70 within a particular circuit, by simultaneously moving together at least partway to their first positions. In exemplary embodiments, makeup valves 86 may also assist in creating bypass flow for an "open center feel." For example, such functionality may control an associated actuator to stop when load on the actuator increases and/or when an operator provides a constant motion command via interface device 46. In such exemplary embodiments, flow from pump 66 may be diverted to tank 98 during such a load increase and/or a constant motion command. Such functionality may enable the operator to accomplish delicate position control tasks, such as cleaning a dirt wall with work tool 14 without breaking the dirt wall.

Relief valves 88 may be provided to allow fluid relief from the hydraulic cylinders 26, 32, 34 and from each circuit 58, 60, 62 into charge circuit 64 when a pressure of the fluid exceeds a set threshold of relief valves 88. Relief valves 88 may be set to operate at relatively high pressure levels in order to prevent damage to hydraulic system 56, for example at levels that may only be reached when hydraulic cylinders 26, 32, 34 reach an end-of-stroke position and the flow from the associated pumps 66 is nonzero, or during a failure condition of hydraulic system 56.

Charge circuit 64 may include at least one hydraulic source fluidly connected to common passage 90 described above. In the disclosed embodiment, charge circuit 64 has two sources, including a charge pump 94 and an accumulator 96, which may be fluidly connected to common passage 90 in parallel to provide makeup fluid to hydraulic circuits 58, 60, 62. Charge pump 94 may embody, for example, an engine-driven, fixed or variable displacement pump configured to draw fluid from a tank 98, pressurize the fluid, and discharge the fluid into common passage 90. Accumulator 96 may embody, for example, a compressed gas, membrane/spring, or bladder type of accumulator configured to accumulate pressurized fluid from and discharge pressurized fluid into common passage 90. Excess hydraulic fluid, either from charge pump 94 or from hydraulic circuits 58, 60, 62 (i.e., from operation of pumps 66 and/or the rotary and linear actuators) may be directed into either accumulator 96 or into tank 98 by way of a charge relief valve 100 disposed in a return passage 102. Charge relief valve 100 may be movable from a flow-blocking position toward a flow-passing position as a result of elevated fluid pressures within common passage 90 and return passage 102. A manual service valve 104 may be associated with accumulator 96 to facilitate draining of accumulator 96 to tank 98 during service of charge circuit 64.

During operation of machine 10, the operator of machine 10 may utilize interface device 46 to provide a signal that identifies a desired movement of the various linear and/or rotary actuators to a controller 124. Based upon one or more signals, including the signal from interface device 46 and, for example, signals from various pressure sensors 126 and/or position sensors (not shown) located throughout hydraulic system 56, controller 124 may command movement of the different valves and/or displacement changes of the different pumps and motors to advance a particular one or more of the linear and/or rotary actuators to a desired position in a desired manner (i.e., at a desired speed and/or with a desired force). Exemplary signals received and control signals sent by the controller 124 are illustrated schematically in FIG. 2.

Controller 124 may embody a single microprocessor or multiple microprocessors that include components for controlling operations of hydraulic system 56 based on input from an operator of machine 10 and based on sensed or other known operational parameters. Numerous commercially available microprocessors can be configured to perform the functions of controller 124. It should be appreciated that controller 124 could readily be embodied in a general machine microprocessor capable of controlling numerous machine functions. Controller 124 may include a memory, a secondary storage device, a processor, and any other components for running an application. Various other circuits may be associated with controller 124 such as power supply circuitry, signal conditioning circuitry, solenoid driver circuitry, and other types of circuitry.

INDUSTRIAL APPLICABILITY

The disclosed hydraulic system may be applicable to any machine where improved hydraulic efficiency and performance is desired. The disclosed hydraulic system may provide for improved efficiency through the use of meterless technology. The disclosed hydraulic system may provide for enhanced functionality and control through the selective use of novel circuit configurations. Operation of hydraulic system 56 will now be described.

During operation of machine 10, an operator located within station 20 may command a particular motion of work tool 14 in a desired direction and at a desired velocity by way of interface device 46. One or more corresponding signals generated by interface device 46 may be provided to controller 124 indicative of the desired motion, along with machine performance information, for example sensor data such a pressure data, position data, speed data, pump displacement data, and other data known in the art.

In response to the signals from interface device 46 and based on the machine performance information, controller 124 may generate control signals directed to pumps 66 and to valves 76, 76A, 78, 80, 82, 84, 86, 92, 120. For example, to rotate left travel motor 42L at an increasing speed in the first direction, controller 124 may generate a control signal that causes pump 66 of hydraulic circuit 62 to increase its displacement and discharge fluid into first pump passage 68 at a greater rate. In addition, controller 124 may generate a control signal that causes switching valves 76 to move toward and/or remain in their flow-passing positions. After fluid from pump 66 passes into and through left travel motor 42L via first pump passage 68, the fluid may return to pump 66 via second pump passage 70. To reverse the motion of left travel motor 42L, the output direction of pump 66 may be reversed. Alternatively, the pump valve 92 may be transitioned from the first position directing fluid from the pump 66 to the first pump passage 68, to the second position (shown in FIG. 2) directing fluid from the pump 66 to the second pump passage 70. In still further exemplary embodiments, motion of the left travel motor 42L may be reversed by transitioning the switching valve 76 associated with left travel motor 42L from the direct flow passing position to the cross-flow passing position. By utilizing the switching valve 76, the flow direction of fluid passing through the left travel motor 42L, and thus the rotation direction of the left travel motor 42L, may be selectively and variably switched independent of, for example, the flow direction of fluid passing through the right travel motor 42R. It is understood that one or both of left and right travel motors 42L, 42R may comprise overcenter-type motors, and in such embodiments, the rotation direction of such motors can be changed by changing their displacement from positive to negative, and vice versa. In addition, in exemplary embodiments in which the switching valve 76 comprises a variable position valve, flow through the left travel motor 42L may be variably restricted such that the rotational speed of the left travel motor 42L may be changed and/or otherwise controlled independent of the speed of the right travel motor 42R. Such independent direction and/or speed control of multiple actuators driven by a single pump 66 may be advantageous in a variety of mining, construction, and/or other applications in which the machine 10 is employed. In addition, simultaneously driving more than one actuator with a single pump 66 may assist in reducing the number of pumps 66 required to operate the hydraulic system 56, thereby lowering the cost and reducing the complexity of the system 56.

If, during the motion of left travel motor 42L, the pressure of fluid within either of first or second pump passages 68, 70 becomes excessive (for example during an overrunning condition), fluid may be relieved from the pressurized passage to tank 98 via relief valves 88 and common passage 90. In contrast, when the pressure of fluid within either of first or second pump passages 68, 70 becomes too low, fluid from charge circuit 64 may be allowed into hydraulic circuit 62 via common passage 90 and makeup valves 86.

During the motion of left travel motor 42L and/or right travel motor 42R, the operator may simultaneously request movement of hydraulic cylinder 32. For example, the operator may request via interface device 46 that hydraulic cylinder 32 be retracted at an increasing speed. When this occurs, controller 124 may generate a control signal that causes pump 66 of hydraulic circuit 62 to increase its displacement and discharge fluid into first pump passage 68 at a greater rate. Controller 124 may also generate a control signal that causes switching valve 76 associated with the hydraulic cylinder 32 to move toward and/or remain in either the direct flow passing position or the cross-flow passing position. In addition, controller 124 may generate a control signal that causes, for example, third valve 82 and second valve 80 of the combining valve 107 associated with hydraulic circuit 62 to move toward and/or remain in their flow-passing positions. At this time, first valve 78 and fourth valve 84 of the combining valve 107 may be in their flow-blocking positions. As fluid from pump 66 passes into second chamber 54 of hydraulic cylinder 32 via first pump and rod-end passages 68, 72, fluid may be discharged from first chamber 52 back to pump 66 via head-end and second pump passages 74, 70.

The motion of hydraulic cylinder 32 may be reversed in several different ways. First, the operation of pump 66 may be reversed, thereby reversing the flows of fluid into and out of hydraulic cylinder 32. Although satisfactory in some situations, this first method of reversing cylinder motion may only be possible when the displacement of left travel motor 42L and/or right travel motor 42R is also simultaneously reversed (so as to maintain travel in a desired constant direction), or when the left and right travel motors 42L, 42R are already stopped and isolated from hydraulic cylinder 32. Thus, as a second option, the motion of hydraulic cylinder 32 may be reversed by switching the position of switching valve 76 from, for example, the direct flow passing position to the cross-flow passing position. Changing the configuration of the switching valve 76 in this way may reverse the flows of fluid into and out of hydraulic cylinder 32 via rod-end passage 72 and head-end passage 74. If, during the motion of hydraulic cylinder 32, the pressure of fluid within either of rod-end passage 72 or head-end passage 74 becomes excessive (for example during an overrunning condition), fluid may be relieved from the pressurized passage to tank 98 via relief valves 88 and connection 138. In contrast, when the fluid pressure becomes too low, fluid from charge circuit 64 may be allowed into the hydraulic cylinder 32 via connection 138 and makeup valves 89. As a third option, the motion of hydraulic cylinder 32 may be reversed by switching the position of one or more of the associated combining valves 107 from, for example, the direct flow passing position to the cross-flow passing position. Finally, with respect to only the disclosed rotary actuators in embodiments in which such actuators comprise overcenter-type motors, the direction of such motors may be reversed by changing their displacement from positive to negative, and vice versa.

As described above, hydraulic cylinder 32 may discharge more fluid from first chamber 52 during retracting operations than is consumed within second chamber 54, and consume more fluid that is discharged from second chamber 54 during an extending operation. During these operations, the switching valve 76 associated with the hydraulic cylinder 32, in conjunction with the one or more combining valves 107 of the hydraulic system 56, may be operated to allow the excess fluid to enter and fill accumulator 96 (when the excess fluid has a sufficiently high pressure, for example during an overrunning condition) or to exit and replenish hydraulic circuit 62, thereby providing a neutral balance of fluid entering and exiting pump 66 of circuit 62.

Regeneration of fluid may be possible during retracting operations of hydraulic cylinder 32, when the pressure of fluid exiting first chamber 52 of hydraulic cylinder 32 is elevated. Regeneration of fluid may also be possible during extending operations of hydraulic cylinder 32 when the pressure in second chamber 54 is higher than the pressure in first chamber 52. Specifically, during the retracting operation described above, both of makeup valves 89 may allow some of the fluid exiting first chamber 52 to bypass pump 66 and flow directly into second chamber 54. It is understood that load demand on pump 66 may be reduced during regeneration operations as compared to non-regeneration motion of hydraulic cylinder 32. Thus, the regeneration operations described above may help to reduce a load on pump 66, while still satisfying operator demands, thereby increasing an efficiency of machine 10. The bypassing of pumps 66 may also reduce a likelihood of pumps 66 overspeeding. In such operations, the switching valve 76 associated with the hydraulic cylinder 32 may variably restrict flow through the hydraulic cylinder 32 as desired to affect the speed of the hydraulic cylinder 32 during regeneration. Such a restriction may facilitate energy dissipation and improve controllability of the hydraulic cylinder 32.

In the disclosed embodiments of hydraulic system 56, flows provided by pump 66 may be substantially unrestricted such that significant energy is not unnecessarily wasted in the actuation process. Thus, embodiments of the disclosure may provide improved energy usage and conservation. In addition, the meterless operation of hydraulic system 56 may, in some applications, allow for a reduction or even complete elimination of metering valves for controlling fluid flow associated with the linear and rotary actuators. This reduction may result in a less complicated and/or less expensive system.

The disclosed hydraulic system 56 may further provide for improved actuator control. In particular, switching valves 76 may enable independent flow direction control of the associated actuators when more than one actuator is being simultaneously driven by a single pump 66. Variable position switching valves 76 may also enable independent speed control of the associated actuators in such embodiments, and may assist in independently reducing linear actuator speed during regeneration. Moreover, when more than one pump 66 is operated to provide a combined flow of fluid to variable position switching valve 76, the switching valve 76 may change the speed of the associated actuator by variably restricting flow through the actuator. Such independent control of individual actuators in either isolated or fluidly connected hydraulic circuits may increase the efficiency and functionality of the hydraulic system 56.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system, comprising:

a first variable displacement pump;

a variable displacement first travel motor selectively fluidly connected to the first variable displacement pump in a closed-loop manner in a first hydraulic circuit;

a first switching valve associated with the first travel motor and configured to selectively switch a flow direction of fluid passing through the first travel motor from the first variable displacement pump;

a variable displacement second travel motor selectively fluidly connected to the first variable displacement pump in a closed-loop manner;

a second switching valve associated with the second travel motor and configured to selectively switch a flow direction of fluid passing through the second travel motor from the first variable displacement pump, a linear actuator selectively fluidly connected to the first variable displacement pump in a closed-loop manner, and a third switching valve associated with the linear actuator, the third switching valve configured to change a speed of the linear actuator independent of the speed of the first and second travel motors, wherein the first variable displacement pump is configured to provide fluid to the first and second travel motors and the linear actuator simultaneously, and a second hydraulic circuit selectively fluidly connected to the first hydraulic circuit via at least one combining valve, the second hydraulic circuit including a second variable displacement pump, wherein the at least one combining valve is configured to direct fluid from the first and second pumps to the linear actuator.

2. The system of claim 1, further comprising a displacement controller configured to change a displacement of the pump in response to a combined demand of the first and second travel motors.

3. The system of claim 1, wherein the first switching valve is configured to change a speed of the first travel motor independent of a speed of the second travel motor.

4. The system of claim 1, wherein the first switching valve comprises a variable position valve configured to change a speed of the first travel motor by variably restricting flow through the first travel motor.

5. The system of claim 1, wherein the first switching valve is configured to selectively switch the flow direction of fluid passing through the first travel motor independent of the flow direction of fluid passing through the second travel motor.

6. A hydraulic system, comprising:

a first hydraulic circuit, the first hydraulic circuit including a variable displacement first pump, a variable displacement first travel motor selectively fluidly connected to the first pump in a closed-loop manner, a first switching valve associated with the first travel motor and configured to change a speed of the first travel motor, a variable displacement second travel motor selectively fluidly connected to the first pump in a closed-loop manner, and a second switching valve associated with the second travel motor and configured to change a speed of the second travel motor independent of the speed of the first travel motor, wherein the first pump is configured to provide fluid to the first and second travel motors simultaneously, wherein the first hydraulic circuit further comprises a linear actuator selectively fluidly connected to the first pump in a closed-loop manner, and a third switching valve associated with the linear actuator, the third switching valve configured to change a speed of the linear actuator independent of the speed of the first and second travel motors, wherein the first pump is configured to provide fluid to the first and second travel motors and the linear actuator simultaneously, and further comprising a second hydraulic circuit selectively fluidly connected to the first hydraulic circuit via at least one combining valve, the second hydraulic circuit including a second variable displacement pump, wherein the at least one combining valve is configured to direct fluid from the first and second pumps to the linear actuator.

7. The system of claim 6, wherein the first switching valve is configured to selectively switch a flow direction of fluid passing through the first travel motor independent of a flow direction of fluid passing through the second travel motor.

8. The system of claim 6, wherein the third switching valve is configured to variably restrict flow through the linear actuator during simultaneous operation of the linear actuator and at least one of the first and second travel motors.

9. The system of claim 6, wherein the third switching valve is configured to variably restrict flow through the linear actuator when fluid from the first and second pumps is directed to the linear actuator via the at least one combining valve.

10. A method of controlling a hydraulic system, comprising:

providing fluid to a variable displacement first travel motor in a closed loop manner with a variable displacement pump;

simultaneously providing fluid to a variable displacement second travel motor in a closed loop manner with the pump; and changing a speed of the second travel motor independent of a speed of the first travel motor, providing fluid to a linear actuator in a closed loop manner with the pump, wherein the fluid is provided to the first and second travel motors and the linear actuator simultaneously, changing a speed of the linear actuator independent of the speeds of the first and second travel motors, and selectively providing fluid from a second pump in a second closed loop circuit to the linear actuator.

11. The method of claim 10, further comprising selectively switching a flow direction of fluid passing through the first travel motor independent of a flow direction of fluid passing through the second travel motor.

12. The method of claim 10, further comprising variably restricting flow through the linear actuator while the fluid is provided to the first and second travel motors and the linear actuator simultaneously, wherein variably restricting flow through the linear actuator controls a speed of the linear actuator.

* * * * *